(12) United States Patent
Andoh et al.

(10) Patent No.: US 6,931,363 B2
(45) Date of Patent: Aug. 16, 2005

(54) EDR DIRECTION ESTIMATING METHOD, SYSTEM, AND PROGRAM, AND MEMORY MEDIUM FOR STORING THE PROGRAM

(75) Inventors: Masataka Andoh, Tokyo (JP); Akira Saitoh, Tokyo (JP); Megu Ohtaki, Hiroshima (JP); Kenichi Satoh, Hiroshima (JP)

(73) Assignee: NEC Corporation, Tokyo (JP)

( * ) Notice: Subject to any disclaimer, the term of this patent is extended or adjusted under 35 U.S.C. 154(b) by 33 days.

(21) Appl. No.: 10/697,762

(22) Filed: Oct. 30, 2003

(65) Prior Publication Data

US 2004/0225478 A1 Nov. 11, 2004

(30) Foreign Application Priority Data

Feb. 26, 2003 (JP) ........................................ 2003-049223

(51) Int. Cl.[7] ............................ G06F 15/00; H03F 1/26
(52) U.S. Cl. ...................................... 702/196; 702/199
(58) Field of Search ................................. 702/196, 179, 702/199, 19, 20; 435/6

(56) References Cited

PUBLICATIONS

Zhu et al., Asymptotics for kernel Estimate of Sliced Inverse Regression, 1996, The annals of statistics, vol. 24, No. 3, pp. 1053–1068.*
Bura et al. Graphical Methods for Class Prediction Using Dimension Reduction Techniques on DNA Microarray Data, The George Washington University, Depart. of Statistics, Date Unknown.*
Li, High Dimensional Data Analysis Via the SIR/PHD Approach, Apr. 2000, www.stat.ucla.edu/~kcli/sir–PHD.pdf.*
Zhu et al., Asymptotics of Sliced Inverse Regression, 1995, Statistica Sinica 5, pp. 727–736.*
Yin et al., Dimension Reduction for the Conditional Kth Moment in Regression, 2002, J.R. Statist. Soc. B, vol. 64, Part 2, pp. 159–175.*
Hristache et al., Direct estimation of the Index Coefficient in a Single–Index Model, 2001, The Annals of Statistics, vol. 29, No. 3, pp. 595–623.*
Ker–Chau Li, "Sliced Inverse Regression for Dimension Reduction", Journal of the American Statistical Association, Jun. 1991, vol. 86, No. 414, pp. 316–342.

(Continued)

Primary Examiner—Bryan Bui
Assistant Examiner—Toan M. Le
(74) Attorney, Agent, or Firm—Scully, Scott, Murphy & Presser

(57) ABSTRACT

The aim of the present invention is to estimate EDR directions in a single index model composed of a large number of variables with simple calculations without using the inverse matrix of the variance-covariance matrix and principle component analysis. Data conversion means 21 receives, from an input device 3, data to be analyzed, the data composed of sets of response variables and explanatory variables, standardizes the explanatory variables, and sends them to slice average calculating means 22. The slice average calculating means 22 divides the data into two slices with reference to the median of the response variables to calculate the mean vector of the explanatory variables on a slice basis. The calculated mean vectors are sent to EDR direction calculating means 23. The EDR direction calculating means 23 calculates the difference between the mean vectors for respective slices to estimate an EDR direction. The EDR direction calculating means 23 also corrects the estimated EDR direction using the inverse matrix of the correlation matrix of the explanatory variables, if any. Both the estimated EDR direction and the corrected EDR direction are sent to the data conversion means 21, and transformed by the data conversion means 21 into the original coordinate system.

10 Claims, 9 Drawing Sheets

PUBLICATIONS

Wolfgang Haerdle, et al., "Optimal Smoothing in Single–Index Models", The Annals of Statistics, 1993, vol. 21, No. 1, 157–178.

Yingcun Xia, "An Adaptive Estimation of Dimension Reduction Space", J.R. Statist. Soc. B, 2002, vol. 64, Part 3, pp. 363–410.

* cited by examiner

EDR DIRECTION ESTIMATING METHOD, SYSTEM, AND PROGRAM, AND MEMORY MEDIUM FOR STORING THE PROGRAM

BACKGROUND OF THE INVENTION

The present invention relates to a method and system for estimating EDR directions in a single-index model, and more particularly to a method, system, and program for estimating EDR directions in a single-index model related to a large number of variables, and a memory medium for storing the program.

In general, one of objects of statistical analysis of actual phenomena is to find relationships among various characteristics and make a prediction. In such a case, it is frequent practice to find any relationship from data using regression analysis and make a prediction on certain variables. For example, linear regression analysis or logistic regression analysis is used to analyze the relationship between a response variable y and an explanatory variable x.

However, the higher the dimension p of the explanatory variable x, the more difficult it is to perform this type of regression analysis. To solve this problem, there have been proposed several methods to reduce the number of dimensions of the explanatory variable x.

For example, referring to the following document 1 (Ker-Chau Li, "Sliced inverse regression for dimension reduction," Journal of the American Statistical Association, Vol. 86 (414), pp. 316–342, 1991.), Ker-Chau Li proposed SIR (Sliced Inverse Regression).

SIR is a method for determining a subspace of x enough to describe the response variable y. The subspace determined is called EDR (Effective Dimension Reduction) space, and a vector spanning the EDR space is called an EDR direction vector. Using conventional regression analysis, the relationship between the response variable y and the explanatory variable x in the EDR space, the dimension of which has been reduced, can be found out.

Referring also to the following document 2 (Ichimura et. al., "Optimal Smoothing in Single Index Models," The Annals of Statistics, Vol. 21, pp. 157–178, 1993. ), Hall and Ichimura estimated EDR directions using a smoothing method.

Referring further to the following document 3 (Xia et al., "An adaptive estimation of dimension reduction space," Journal of the Royal Statistical Society (Series B), Vol. 64, pp. 363–410, 2002. ), Xia et. al. proposed a technique for estimating the EDR space using a non-linear smoothing method. However, if the number of explanatory variables becomes enormous, it will be very difficult to make calculations.

SIR will be described below. In the SIR method, a model indicated by the following equations (1) to (6) is assumed.

$$y = f(\beta_1'x, \ldots \beta_k'x, \epsilon) \quad (1)$$

In this equation, y represents a response variable, f is an unknown function, $\epsilon$ is a random variable independent of x, and x is a p-dimensional explanatory variable. Further, $\beta_1, \ldots, \beta_k$, are p-dimensional unknown coefficient vectors, that is, EDR direction vectors.

Using FIGS. 1 and 2, SIR operations will be described below. First, explanatory variables in a data file inputted from an input device 1 are standardized by data standardizing means 24 of a data analyzer 2 (step A1 in FIG. 2):

$$z_i = \sum\nolimits_{xx}^{-\frac{1}{2}} [x_i - \bar{x}] \quad (i = 1, \ldots, n) \quad (2)$$

where $$\sum\nolimits_{xx}, \bar{x}$$

is a variance-covariance matrix, average of x, respectively.

Then slice average calculating means 22 sorts response variables y and divides them into H slices $I_1 \ldots I_H$ (step A2). Then the proportion of response variables belonging to slice $I_k$ is calculated as $\hat{P}_k$ (see the following equation (3)):

$$\hat{p}_k = \frac{1}{n} \sum_{i=1}^{n} \delta_k(y_i) \text{ where } \delta_k(y_i) \text{ is } \delta_k(y_i) = \begin{cases} 1, & y_i \in I_k, \\ 0, & y_i \notin I_k. \end{cases} \quad (3)$$

Next, using the following equation (4), the mean vector of standardized explanatory variables is calculated for each slice (step A3).

$$m_k = \left[ \frac{1}{n\hat{p}_k} \right] \sum_{y_i \in I_k} z_i \quad (4)$$

Then, principle component analyzing means 25 carries out a principle component analysis of the mean vectors m on a slice basis to determine eigen vectors (step A4).

In this case, the characteristic numbers and eigen vectors are determined using the following equation (5):

$$V = \sum_{k=1}^{H} \hat{p}_k m_k m_k' \quad (5)$$

The data standardizing means 24 extracts K eigen vectors $\eta_k$ (k = 1, . . . , K) with characteristic numbers in descending numeric order, and uses the following equation (6) to transform them into the original coordinate system (step A5):

$$\beta_k = \sum\nolimits_{xx}^{-\frac{1}{2}} \eta_k \quad (6)$$

The EDR direction vectors determined at step A5 are outputted on an output device 3 (step A6).

The first problem of the above-mentioned prior art is that SIR is not applicable to data having a large number of variables such as a DNA chip for gene expression analysis or a micro array. In order to standardize data, SIR requires the inverse matrix of the variance-covariance matrix of explanatory variables, and a principle component analysis for estimating EDR direction vectors to determine eigen vectors. However, if the variables are enormous in number, it may be mathematically impossible to determine the inverse matrix of the variance-covariance matrix, or the principle component analysis may take enormous computation time.

The second problem is that SIR limits the distribution of explanatory variables to elliptic distributions. Therefore, SIR cannot be applied when explanatory variables are binary.

SUMMARY OF THE INVENTION

It is an object of the present invention to provide a method and system, which estimates EDR directions with simple calculations, without using the inverse matrix of the variance-covariance matrix and principle component analysis, when the number of slice is two in a single index model to be represented by the equation below. The single index model means a model, which consists of one unknown coefficient vector and contains conventional multiple linear regression analysis and logistic regression analysis.

The single index model can be represented by the following equation (7):

$$y = f(\beta'_0 x, \epsilon) \quad (7)$$

where y is a response variable, f is an unknown, comprehensive, monotone function, $\epsilon$ is a random variable independent of x, and x is a p-dimensional explanatory variable. Further, $\epsilon_0$ is a p-dimensional unknown coefficient vector, that is, a true EDR direction vector.

It is another object of the present invention not to assume any particular form of distributions of explanatory variables x so that the EDR direction estimating system of the present invention can be applied even when the explanatory variables are binary.

It is still another object of the present invention to provide a technique and system for searching important genes based on data having a large number of variables such as a DNA chip for gene expression analysis or a micro array.

An EDR direction estimating system according to the present invention includes an input device for inputting a data file to be analyzed, a data analyzer operated under program control, and an output device. In this system, the data analyzer includes data conversion means, which receives data to be analyzed, the data composed of sets of response variables and explanatory variables, standardizes the explanatory variables, and outputs data composed of sets of standardized explanatory variables and response variables, slice average calculating mean, which takes in the data composed of the sets of standardized explanatory variables and response variables, divides the data into two slices with reference to a predetermined threshold for the response variables, calculates the mean vector of the standardized explanatory variables on a slice basis, and outputs the mean vector for each slice, and EDR direction calculating means, which takes in the mean vector for each slice, calculates the difference between the two mean vectors to determine an EDR direction, and outputs the EDR direction data to the data conversion means, such that the data conversion means converts the EDR direction data to a unit vector and outputs the unit vector to the output device as an estimated value for the EDR direction.

An EDR direction estimating method according to the present invention includes the steps of;

inputting a data file to be analyzed;

receiving data to be analyzed, the data composed of sets of response variables and explanatory variables, standardizing the explanatory variables, and outputting data composed of sets of standardized explanatory variables and response variables;

receiving the data composed of the sets of standardized explanatory variables and response variables, dividing the data into two slices with reference to a predetermined threshold for the response variables, calculating the mean vector of the standardized explanatory variables on a slice basis, and outputting the mean vector for each slice;

receiving the mean vector for each slice, calculating the difference between the two mean vectors to determine an EDR direction, and outputting the EDR direction data to the data conversion means; and converting the EDR direction data to a unit vector and outputting the unit vector as an estimated value for the EDR direction.

DESCRIPTION OF THE PREFERRED EMBODIMENT

Figure 1:
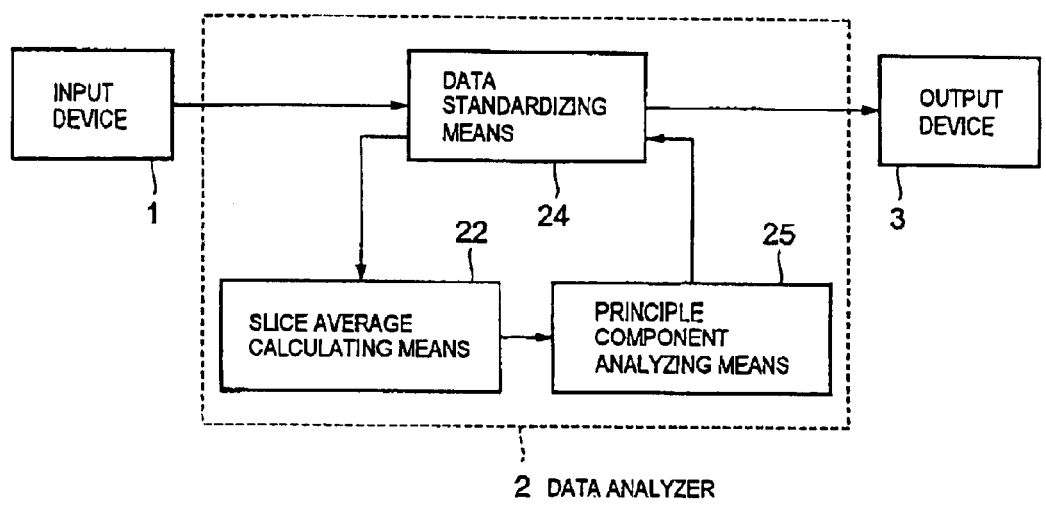
FIG. 1 is a block diagram showing a prior art structure.
Figure 2:
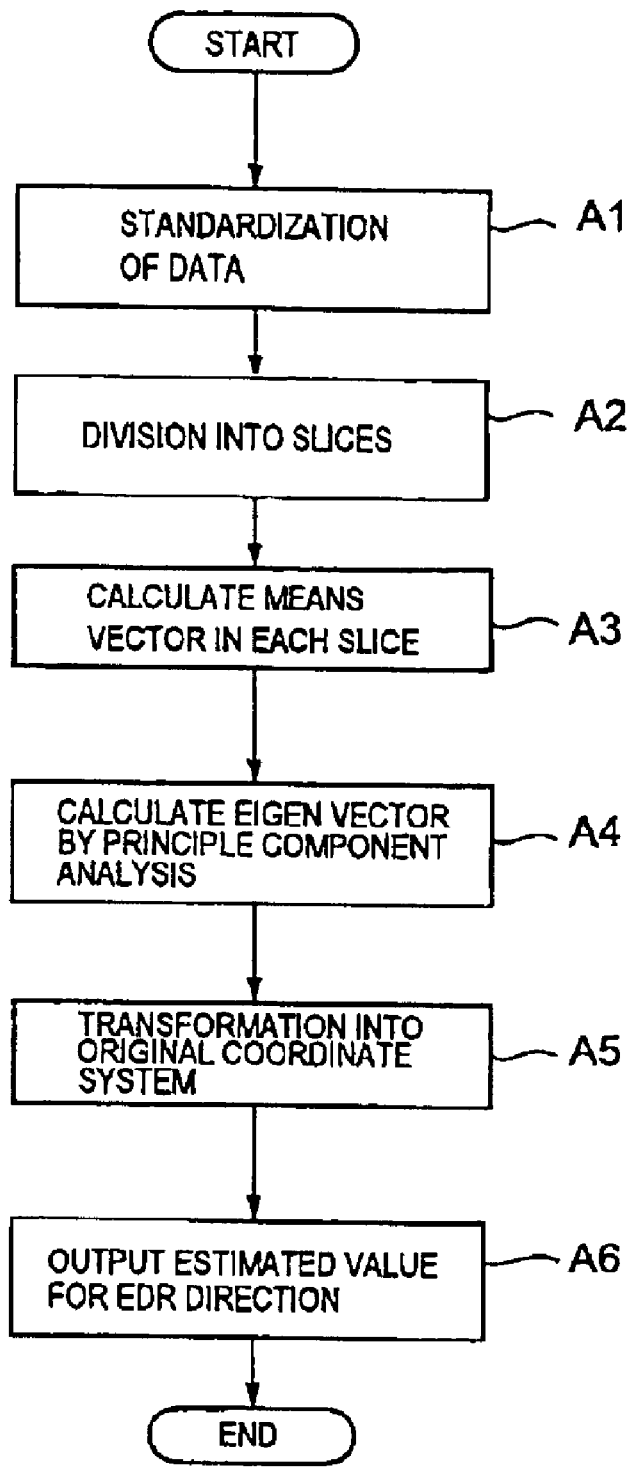
FIG. 2 is a flowchart showing the operation of the prior art.
Figure 3:
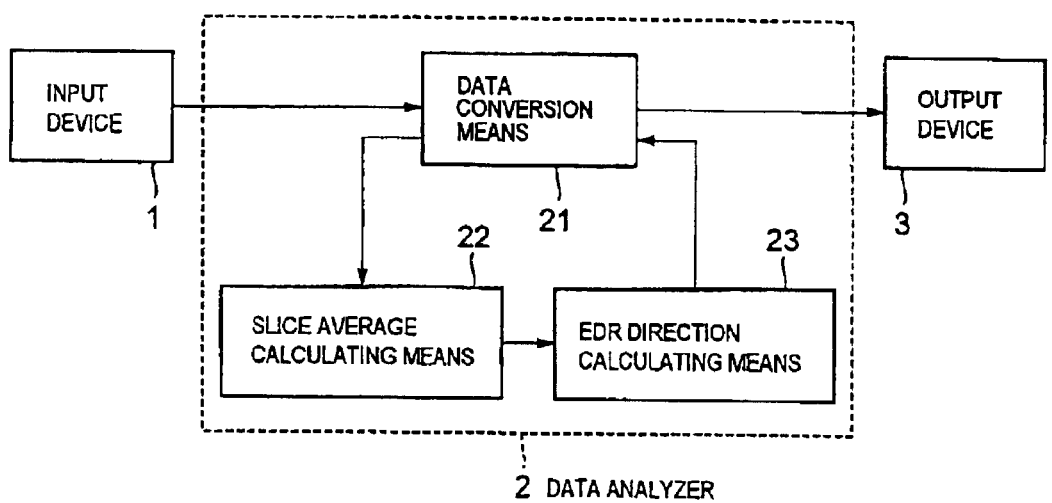
FIG. 3 is a block diagram showing the structure according to a first embodiment of the present invention.

A first embodiment of the present invention will now be described with reference to the accompanying drawings. Referring to FIG. 3, an EDR direction estimating system according to the first embodiment of the present invention includes an input device 1 for inputting a data file to be analyzed, a data analyzer 2 operated under program control, and an output device 3 such as a display device and/or printer. The data file to be analyzed is composed of N sets of data, each set consisting of one response variable and p-dimensional explanatory variable or covariate. The data analyzer 2 includes data conversion means 21, slice average calculating means 22, and EDR direction calculating means 23.

The data conversion means 21 standardizes the N p-dimensional covariates in the data file given, and sends data composed of sets of standardized covariates and response variables to the slice average calculating means 22. The data conversion means 21 transforms the EDR direction given by the EDR direction calculating means 22 and a corrected EDR direction into the original coordinate system, and further converts them to unit vectors, and outputs them to the output device 3.

The slice average calculating means 22 divides the N sets of data into two slices with reference to the median of the response variables. The slice average calculating means 22 further calculates the mean vector of the p-dimensional covariates in each slice, and sends them to the EDR direction calculating means 23.

The EDR direction calculating means 23 determines the difference between the two mean vectors given by the slice average calculating means 22. An EDR direction is determined from this calculation. The EDR direction calculating means 23 further determines the correlation matrix of the p-dimensional covariates. Then, if can calculate the inverse matrix of the correlation matrix, the EDR direction calculating means 23 will correct the EDR direction using the inverse matrix of the correlation matrix, and send both the EDR direction and the corrected EDR direction to the data conversion means 21. On the other hand, if cannot calculate the inverse matrix of the correlation matrix, the EDR direction calculating means 23 will send only the EDR direction to the data conversion means 21.

Figure 4:
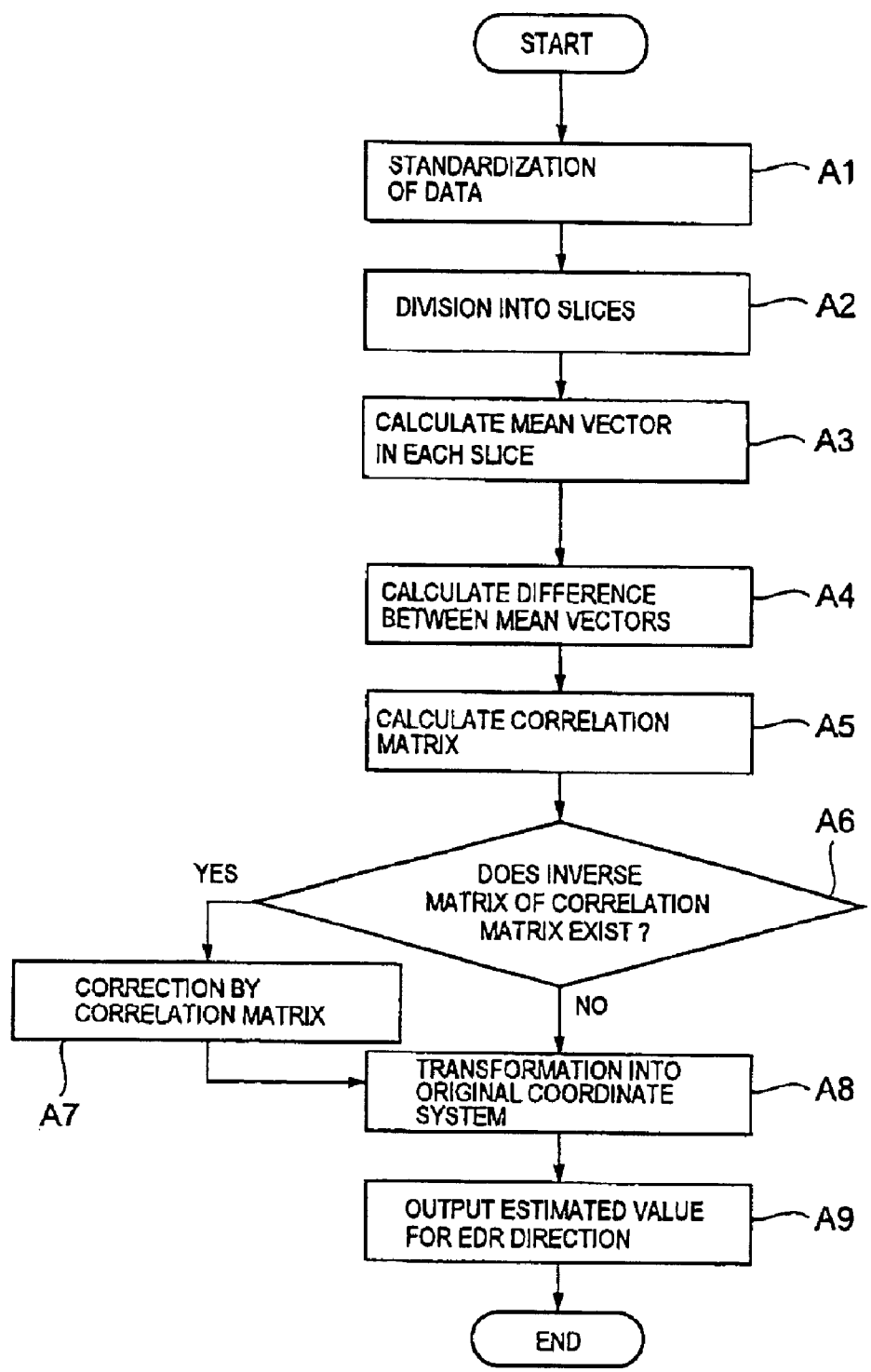
FIG. 4 is a flowchart showing the operation of the first embodiment of the present invention.

Referring next to FIGS. 3 and 4, the operation of the embodiment will be described in detail. It is assumed that the data in the data file to be analyzed are represented by the following equation (8):

$$(y_i, x_i), i=1, \ldots, N \tag{8}$$

where $y_i$ is a response variable and $x_i$ is a p-dimensional covariate. The data to be analyzed are sent to the data conversion means 21. The data conversion means 21 standardizes covariates $x_i^{(j)}$ as represented in the following equation (9) using a sampled average of the covariates $\hat{\mu}(j)$ and a variance $(\hat{\sigma}^{(j)})^2$:

$$z_i^{(j)} = \frac{x_i^{(j)} - \hat{\mu}^{(j)}}{\hat{\sigma}^{(j)}} \tag{9}$$

It is assumed in this equation that $x_i = (x_i^{(1)}, \ldots, x_i^{(p)})$, and the sampled average $\hat{\mu}(j)$ and the variance $(\hat{\sigma}^{(j)})^2$ are given by the following equations (10) and (11) respectively (step A1 in FIG. 4):

$$\hat{\mu}^{(j)} = \frac{\sum_{i=1}^{N} x_i^{(j)}}{N} \tag{10}$$

$$(\hat{\sigma}^{(j)})^2 = \frac{\sum_{i=1}^{N} (x_i^{(j)} - \hat{\mu}^{(j)})^2}{N-1} \tag{11}$$

The slice average calculating means 22 divides, into two slices $I_H$ and $I_L$, the response variables $y_i$ in the data to be analyzed, according to the following equation (12):

$$I_H = \{i | y_i \geq t, i \in I\}, \ I_L = \{i | y_i < t, i \in I\} \tag{12}$$

where the threshold t takes the median of y and $I = \{1, \ldots, N\}$ (step A2).

Then, the mean vectors $\hat{m}_H$, $\hat{m}_L$ of the standardized covariates $z_i$ are calculated for respective slices $I_H$ and $I_L$ according to the following equation (13):

$$\hat{m}_H = \frac{1}{N_H} \sum_{i \in I_H} z_i, \ \hat{m}_L = \frac{1}{N_L} \sum_{i \in I_L} z_i, \tag{13}$$

In this equation, $N_H$ represents the number of data belonging to $I_H$, and $N_L = N - N_H$, and $Z_i = (Z_i^{(1)}, \ldots, Z_i^{(1)})$ (step A3).

Then, according to the following equation (14), the EDR direction calculating means 23 calculates the difference between the mean vectors determined at step A3 (step A4):

$$\hat{\eta} = \frac{1}{2}(\hat{m}_H - \hat{m}_L) \tag{14}$$

Next, at step A5, the correlation matrix $\hat{\Omega}$ of the covariates is calculated.

Then, if can determine the inverse matrix of the correlation matrix $\hat{\Omega}$ at step A6, the EDR direction calculating means 23 will use the inverse matrix to correct $\hat{\eta}$ according to the following equation (15) (step A7):

$$\hat{\eta}_N = \hat{\Omega}^{-1} \hat{\eta} \tag{15}$$

On the other hand, if cannot determine the inverse matrix of the correlation matrix $\hat{\Omega}$ the procedure goes to step A8. The data conversion means 21 transforms the determined $\hat{\eta}$ and $\hat{\eta}_N$ into the original coordinate system, and standardizes them into unit vectors according to the following equation (16) (step A8):

$$\frac{\hat{\Sigma}^{-\frac{1}{2}}\hat{\eta}}{|\hat{\Sigma}^{-\frac{1}{2}}\hat{\eta}|}, \frac{\hat{\Sigma}^{-\frac{1}{2}}\hat{\eta}_N}{|\hat{\Sigma}^{-\frac{1}{2}}\hat{\eta}_N|} \text{ where } \hat{\Sigma} = \text{diag}\{(\hat{\sigma}^{(1)})^2, \ldots, (\hat{\sigma}^{(K)})^2\} \text{ and} \tag{16}$$

$$\hat{\Sigma}^{-1/2} = \text{diag}\left\{\frac{1}{\hat{\sigma}^{(1)}}, \ldots, \frac{1}{\hat{\sigma}^{(K)}}\right\}.$$

The determined vectors are outputted on the output device 3 as estimated values for EDR directions.

The output device 3 displays or prints out a graph showing plots of response variables versus mappings (scores) $\hat{\eta}'x$ and $\hat{\eta}'_N x$ of the covariates x in the EDR directions $\hat{\eta}$ and $\hat{\eta}_N$.

The effects of the embodiment will next be described. In the embodiment, the EDR directions can be estimated without principle component analysis, so that complicated matrix calculations do not need performing, thereby saving a lot of calculation time. Further, the mean vectors and the different between the mean vectors have only to be calculated, so that EDR directions for data having a large number of variables, to which SIR is not applicable, can be estimated.

A second embodiment of the present invention will next be described. In the second embodiment, a mean value is used as the threshold t for the division into slices. The structure of the second embodiment is the same as that of the first embodiment. A different point is that, while the median is used as the threshold t for the division into slices in the operation of the first embodiment, a mean value is used as the threshold t in the operation of the second embodiment.

The effect of this embodiment will be described below. When the distribution of response variables y is skewed for both large values and small values, the use of the median for the division into slices in the first embodiment may not be able to divide both the skewed distributions properly. On the other hand, since the mean value is used for the division into slices in the second embodiment, both the skewed distributions can be divided properly.

A third embodiment of the present invention will next be described. In the third embodiment, the threshold t for the division into slices takes 0.5 when the responses are binary, either 0 or 1. The structure of the third embodiment is the same as that of the first embodiment. A different point is that, while the median is used as the threshold t for the division into slices in the operation of the first embodiment (step A2 in FIG. 4), 0.5 is used as the threshold t in the operation of the third embodiment.

The effect of this embodiment will be described below. When the response variables are binary, either 0 or 1, the use of the median for the division into slices in the first embodiment results in slice division by 0 or 1. On the other hand, since 0.5 is used for the division into slices in this embodiment, the response variables can be divided into a slice for 0s and a slice for 1 s.

A fourth embodiment of the present invention will next be described. The fourth embodiment is to cope with missing values. The structure of the fourth embodiment is the same as that of the first embodiment. A point different from the operation of the first embodiment is that when data are standardized (step A1 in FIG. 4), divided into slices (step A2), and the mean vector is calculated for each slice (step A3), missing values are removed from these calculations in this embodiment.

With respect to the effect of this embodiment since only the missing values are removed from the data to be analyzed, individual data containing the missing values can be effectively used for analysis without removing the individual data themselves.

Figure 5:
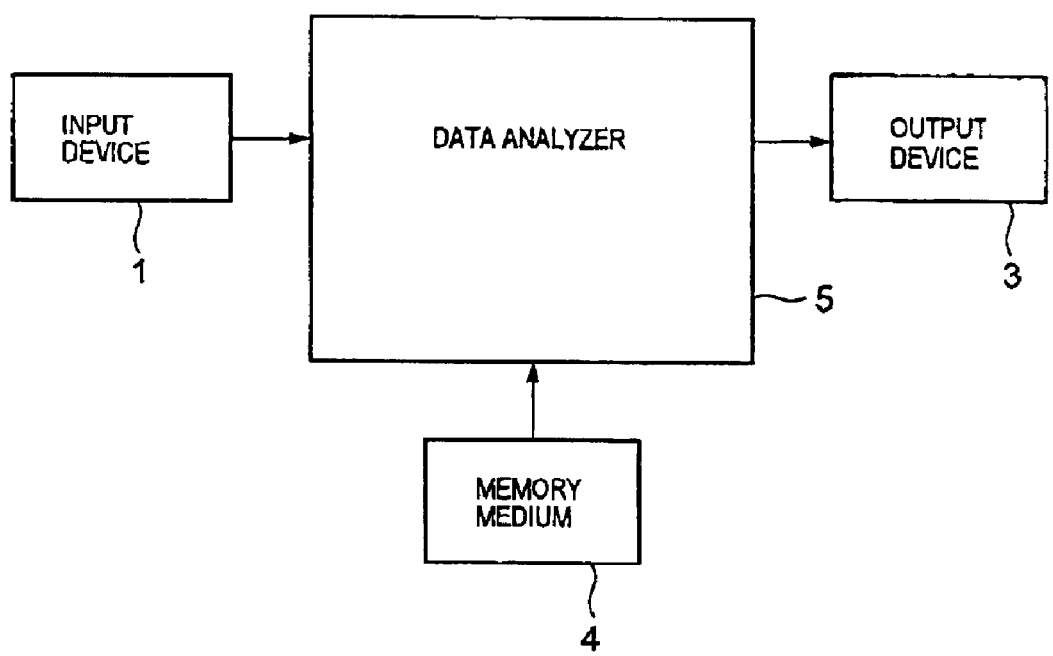
FIG. 5 is a block diagram showing the structure according to a fifth embodiment of the present invention.

Referring to FIG. 5, a fifth embodiment of the present invention will next be described in detail. Like the first to fourth embodiments, the fifth embodiment of the present invention includes the input device, the data analyzer, and the output device. In addition, this embodiment also includes a memory medium 4 with a data analyzing program on it. The memory medium 4 may be either transportable or fixed. For example, it may be a magnetic disk, semiconductor memory, CD-ROM, or any other memory medium.

A computer program capable of executing this method may also be stored in a storage device on a computer connected to a network so that it can be transferred to a storage device on another computer through the network. The medium providing the computer program executing this algorithm can be distributed in the form of a medium readable on a variety of computers, and should not be limited to a particular type of medium.

The data analyzing program is read from the memory medium 4 into a data analyzer 5 to control the operation of the data analyzer 5 to perform the same processing on data file inputted from the input device 1 as the data analyzer 2 does in the first to fourth embodiments.

The above-mentioned first embodiment will next be specifically described with reference to simulation results. A simulation model used in the embodiment is represented by the following equation (17):

$$y = \frac{1}{1 + \exp(-5\eta'_0 z)} + \varepsilon \qquad (17)$$

where $\varepsilon \sim N$ is $(0, 0.05^2)$, $\eta_0$ and z are represented by the following equation (18), and $\Omega(p)$ is determined according to the following equation (19)

$$\eta_0 = \frac{1}{\sqrt{5}}(1, \ldots, 1, 0)', z = (z^{(1)}, \ldots, z^{(6)}) \sim N\{0, \Omega(\rho)\} \qquad (18)$$

$$\Omega(\rho) = \begin{pmatrix} 1 & \rho & 0 & 0 & 0 & 0 \\ \rho & 1 & 0 & 0 & 0 & 0 \\ 0 & 0 & 1 & -\rho & 0 & 0 \\ 0 & 0 & -\rho & 1 & 0 & 0 \\ 0 & 0 & 0 & 0 & 1 & 0 \\ 0 & 0 & 0 & 0 & 0 & 1 \end{pmatrix} \qquad (19)$$

It is assumed here that $\eta_0$ is a true EDR direction, and N (0, 1) represents a normal distribution with average 0 variance 1.

Figure 6:
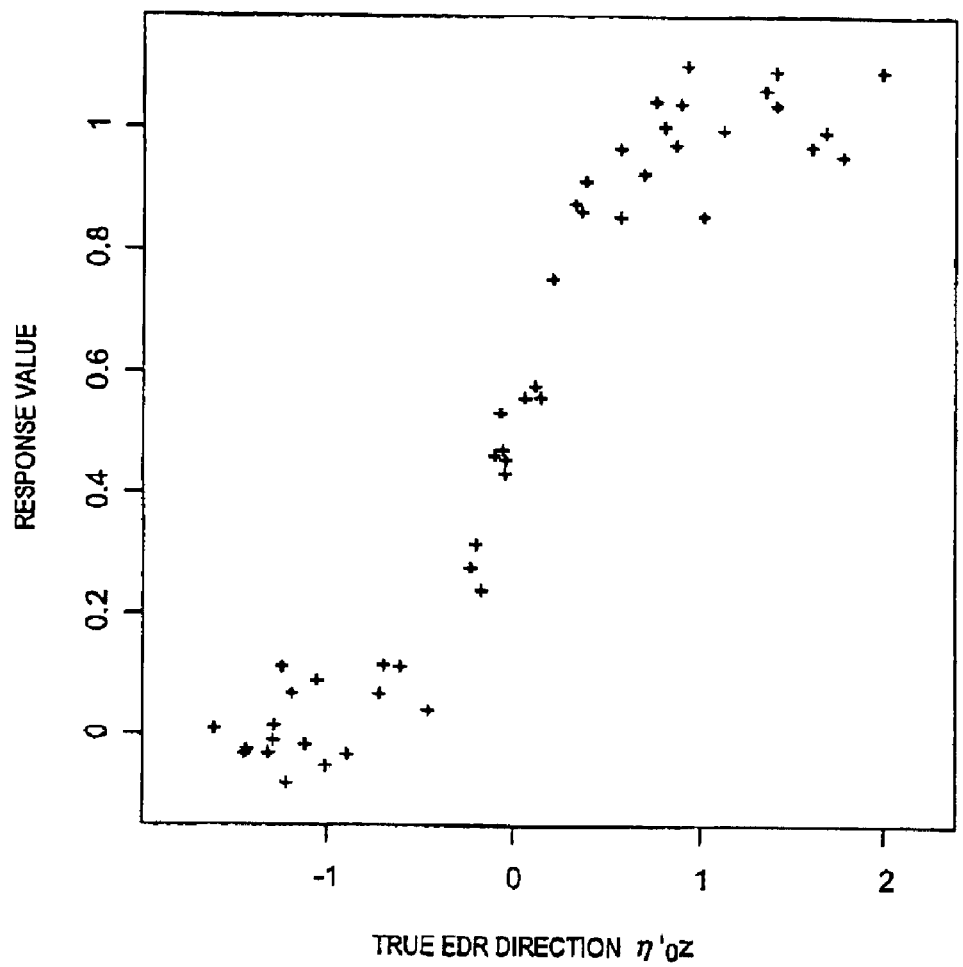
FIG. 6 is a scatter plot showing data crated by a model.

FIG. 6 is a scatter plot of data (data to be analyzed) created by this model. In FIG. 6, N=50 and ρ=0.8, and the response variable y versus $\eta_0'$ z (abscissa) is plotted. In other words, the true EDR direction $\eta_0'$z is plotted on the abscissa and the response variable y is plotted on the ordinate. Here, $\eta_0'$z is called scores in the true EDR direction. The present invention is applied to the data on the scores.

Figure 7:
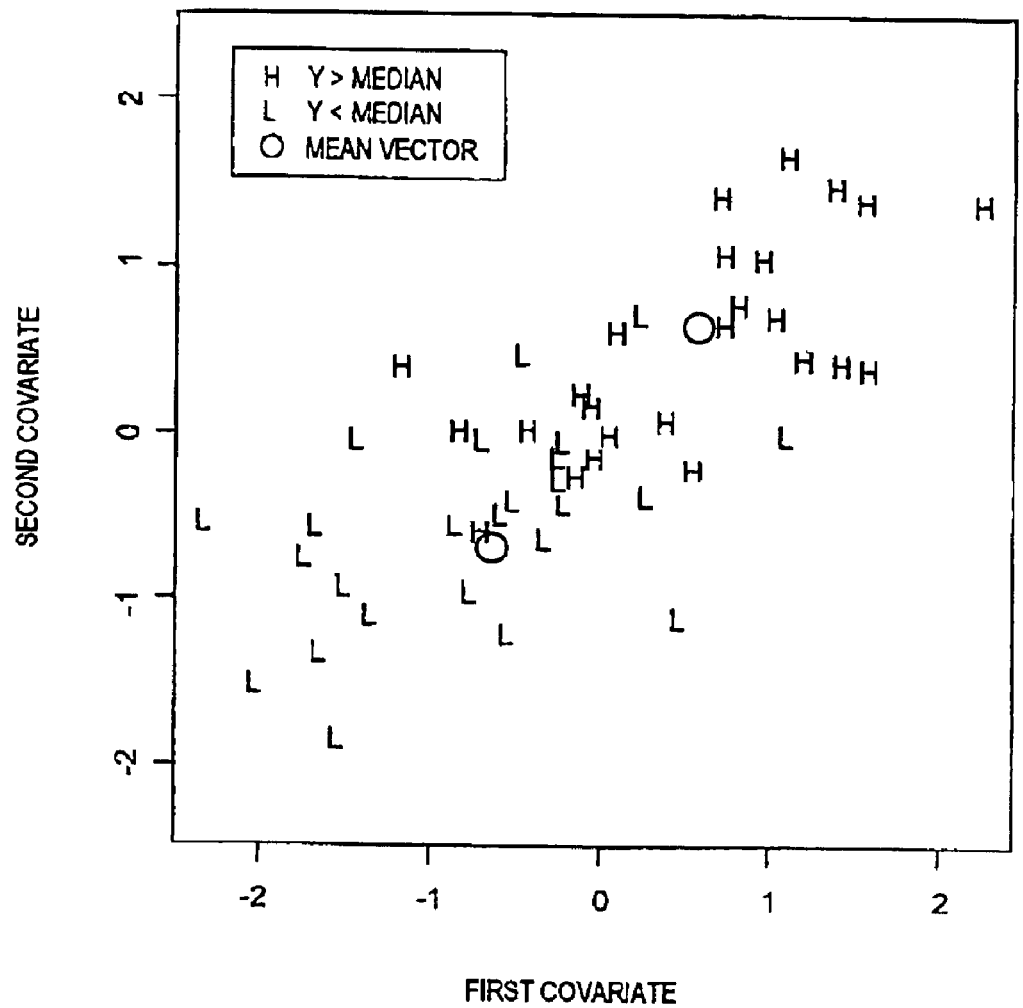
FIG. 7 is a scatter plot of $z^{(1)}$ and $z^{(2)}$.

FIG. 7 is a scatter plot of $z^{(1)}$ and $z^{(2)}$ after the response variables are divided into two slices (step A2 in FIG. 4) and the mean vector is calculated for each slice (step A3). The marks "○" indicate the mean vectors $\hat{m}_H$ and $\hat{m}_L$ where H and L represent whether corresponding response variables are larger or smaller than the median. In FIG. 7, only $z^{(1)}$ and $z^{(2)}$ are shown from among six-dimensional covariates z.

Figure 8:
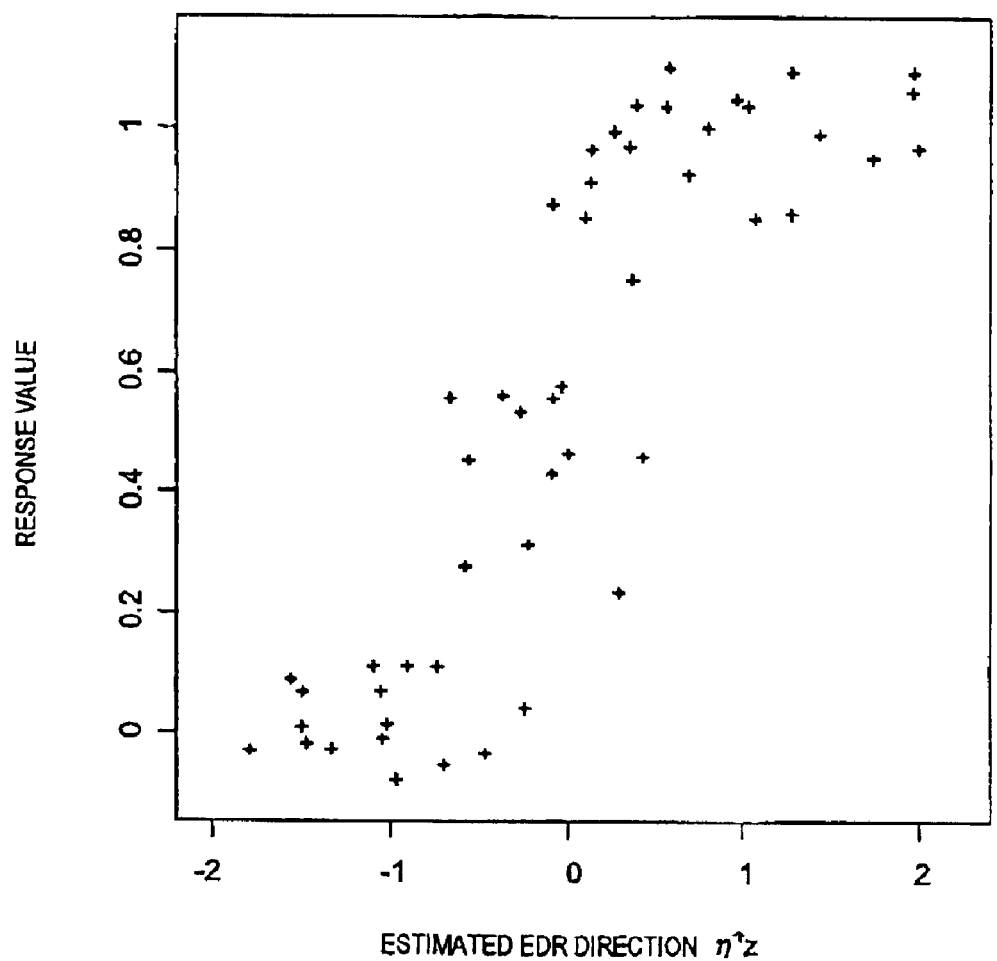
FIG. 8 is a scatter plot of response variables versus estimated EDR directions.

FIG. 8 is a scatter plot of response variables y versus scores $\hat{\eta}'_z$ (abscissa) in the EDR direction $\hat{\eta}$ estimated from the difference between the mean vectors (step A4), in which $\hat{\eta}'_z$ is plotted on the abscissa and the response variable is plotted on the ordinate.

Figure 9:
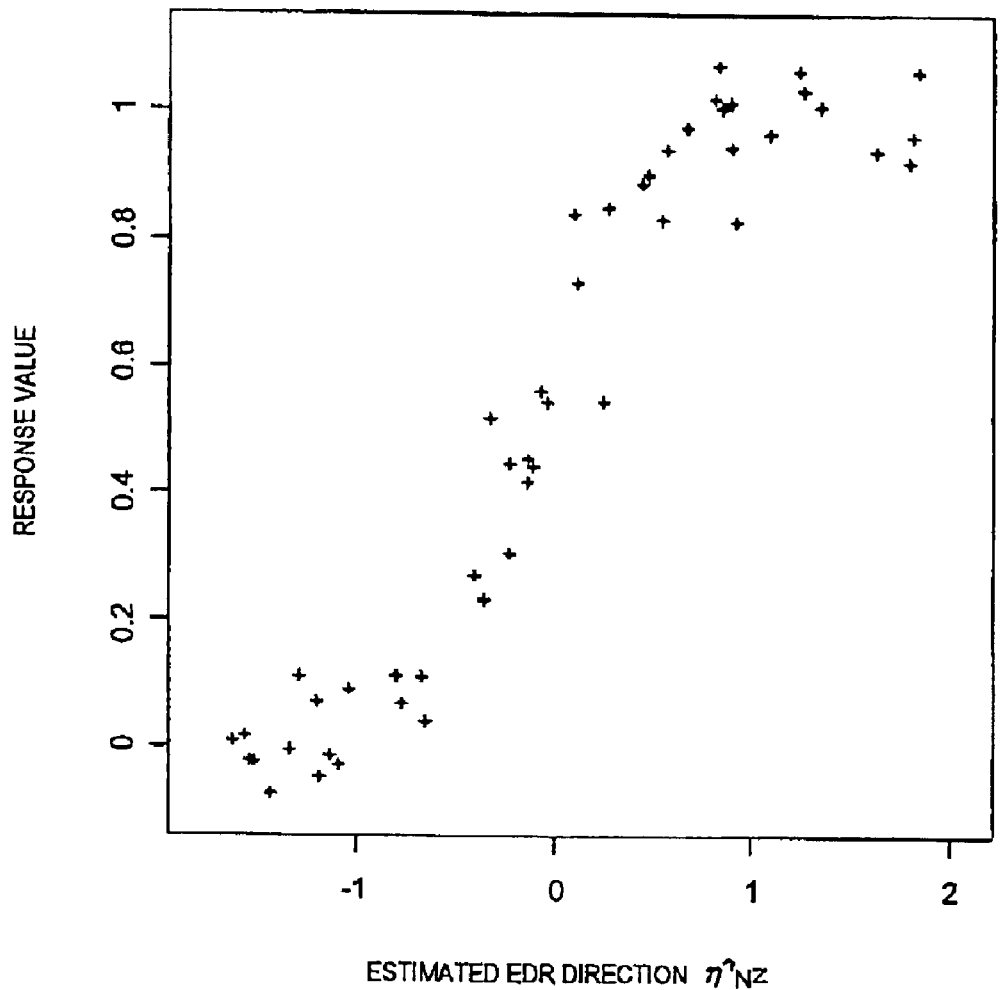
FIG. 9 is a scatter plot of response variables versus EDR directions corrected by a correlation matrix.

FIG. 9 is a scatter plot of response variables y versus scores $\hat{\eta}'_n$ z in the EDR direction $\hat{\eta}'_z$ corrected by the correlation matrix. As is apparent from comparisons among FIGS. 6, 8, and 9 that the true EDR direction can be estimated using the present invention. In FIG. 9, $\hat{\eta}'_n$ z is plotted on the abscissa and the response variable is plotted on the ordinate.

The following table (1) shows mean values and standard deviations of correlation coefficients between scores in the true EDR direction and scores in the estimated EDR direction (where N=50, 100, 500, and ρ=0.0, 0.8 in 100,000 tries), and mean values and standard deviations of correlation coefficients between scores in the estimated EDR direction and two-valued response variables (where N=50, 100, 500, and ρ=0.0, 0.8 in 100,000 tries). Representing the two-valued response variables by δ, the following equation (20) is given:

TABLE 1

| N | ρ = 0.0 | | ρ = 0.8 | |
|---|---|---|---|---|
| | Cor($\hat{\eta}'z, \eta'_0 z$) | Cor($\hat{\eta}'z, \delta$) | Cor($\hat{\eta}'z, \hat{\eta}'_0 z$) | Cor($\hat{\eta}'z, \delta$) |
| 50 | 0.936 | 0.803 | 0.921 | 0.769 |
| | (0.039) | (0.034) | (0.032) | (0.039) |
| 100 | 0.967 | 0.799 | 0.935 | 0.762 |
| | (0.021) | (03023) | (0.020) | (0.027) |
| 500 | 0.993 | 0.798 | 0.946 | 0.758 |
| | (0.004) | (0.010) | (0.007) | (0.012) |

$$\delta = \begin{cases} 1, & y \geq t, \\ -1, & y < t \end{cases} \qquad (20)$$

Here, the threshold t is the median of the response variables, showing mean values and standard deviations of correlation coefficients in the variations of N=50, 100, 500, and ρ=0.0, 0.8 in 100,000 analytical tries, respectively. The above table 1 shows that the correlation coefficients between scores in the true EDR direction and scores in the estimated EDR direction are close to 1, and the variances are small values. It can be found from these facts that the true EDR direction can be estimated using the present invention.

The above table (1) also shows that the correlation coefficients between scores in the estimated EDR direction and two-valued response variables do not vary very much even as the number of samples increases. It can be found from this fact that the EDR direction can be estimated regardless of the number of data.

According to the present invention, the inverse matrix of the variance-covariance matrix is not used to standardize data in a single index model, so that the data can be standardized using only the average and variance of the data, thereby standardizing data with a large number of variables.

Also, according to the present invention, the EDR direction when the number of slices is two can be determined without carrying out the principle component analysis. In other words, the EDR direction can be determined just by calculating the difference between the mean vectors, and this makes it possible to determine EDR direction when the number of slices is two in a single index model composed of a large number of variables. The computing speed is improved as well.

For the above-mentioned reasons, the technique can be applied to data with a large number of variables such as a DNA chip for gene expression analysis or a micro array. When it is applied to data in a micro array, the response variable y takes forms of expression such as side effects and x represents the amount of expression of each gene obtained by the micro array. With respect to coefficients in the EDR direction obtained, it shows that gene A with a large coefficient has a more significant impact on the forms of expression than gene B with a small coefficient, that is, gene A is more important than gene B. Thus, depending on the magnitude of coefficients, genes important to the forms of expression can be searched.

What is claimed is:

1. An effective dimension reduction (EDR) direction estimating method for estimating EDR directions in a single index model related to a large number of variables, comprising the steps of:

inputting a data file to be analyzed;

receiving data to be analyzed, the data composed of sets of response variables and explanatory variables, standardizing the explanatory variables, and outputting data composed of sets of standardized explanatory variables and response variables;

receiving the data composed of the sets of standardized explanatory variables and response variables, dividing the data into two slices with reference to a predetermined threshold for the response variables, calculating the mean vector of the standardized explanatory variables on a slice basis, and outputting the mean vector for each slice;

receiving the mean vector for each slice, calculating the difference between the two mean vectors to determine an EDR direction, and outputting the EDR direction data to data conversion means; and converting the EDR direction data to a unit vector, and outputting the unit vector as an estimated value for the EDR direction.

2. A method according to claim 1, wherein when the inverse matrix of the correlation matrix exists, the EDR direction data is corrected by the inverse matrix of the correlation matrix in said step of calculating the EDR direction to send both the EDR direction data and the corrected EDR direction data to the data conversion means, or when the inverse matrix of the correlation matrix does not exist, only the EDR direction data is sent to the data conversion means.

3. A method according to claim 1 or 2, wherein the threshold is the median of the response variables.

4. A method according to claim 1 or 2, wherein the threshold is the mean value of the response variables.

5. A method according to claim 1 or 2, wherein the threshold is 0.5 when the response variables are binary.

6. A method according to any one of claims 1 through 5, wherein missing values are removed from calculations for standardizing the explanatory variables, dividing the standardized explanatory variables into slices, and determining the mean vectors.

7. An effective dimension reduction (EDR) direction estimating system for estimating EDR directions in a single index model related to a large number of variables, including an input device for inputting a data file to be analyzed, a data analyzer operated under program control, and an output device, wherein said data analyzer includes data conversion means, which receives data to be analyzed, the data composed of sets of response variables and explanatory variables, standardizes the explanatory variables, and outputs data composed of sets of standardized explanatory variables and response variables, slice average calculating means, which takes in the data composed of the sets of standardized explanatory variables and response variables, divides the data into two slices with reference to a predetermined threshold for the response variables, calculates the mean vector of the standardized explanatory variables on a slice basis, and outputs the mean vector for each slice, and EDR direction calculating means, which takes in the mean vector for each slice, calculates the difference between the two mean vectors to determine an EDR direction, and outputs the EDR direction data to said data conversion means, such that said data conversion means converts the EDR direction data to a unit vector and outputs the unit vector to said output device as an estimated value for the EDR direction.

8. A system according to claim 7, wherein when the inverse matrix of the correlation matrix exists, said EDR direction calculating means corrects the EDR direction by the inverse matrix of the correlation matrix and sends both the EDR direction data and the corrected EDR direction data to said data conversion means, or when the inverse matrix of the correlation matrix does not exist, said EDR direction calculating means sends only the EDR direction data to said data conversion means.

9. An effective dimension reduction (EDR) direction estimating program for estimating EDR directions in a single index model related to a large number of variables, said program instructing a computer to execute the steps of:

inputting a data file to be analyzed;

receiving data to be analyzed, the data composed of sets of response variables and explanatory variables, standardizing the explanatory variables, and outputting data composed of sets of standardized explanatory variables and response variables;

receiving the data composed of the sets of standardized explanatory variables and response variables, dividing the data into two slices with reference to a predetermined threshold for the response variables, calculating the mean vector of the standardized explanatory variables on a slice basis, and outputting the mean vector for each slice;

receiving the mean vector for each slice, calculating the difference between the two mean vectors to determine an EDR direction, and outputting the EDR direction data to data conversion means; and converting the EDR direction data to a unit vector, and outputting the unit vector as an estimated value for the EDR direction.

10. A computer-readable memory medium with an effective dimension reduction (EDR) direction estimating program stored on it for instructing a computer to execute the steps of:

inputting a data file to be analyzed;

receiving data to be analyzed, the data composed of sets of response variables and explanatory variables, standardizing the explanatory variables, and outputting data composed of sets of standardized explanatory variables and response variables;

receiving the data composed of the sets of standardized explanatory variables and response variables, dividing the data into two slices with reference to a predetermined threshold for the response variables, calculating the mean vector of the standardized explanatory variables on a slice basis, and outputting the mean vector for each slice;

receiving the mean vector for each slice, calculating the difference between the two mean vectors to determine an EDR direction, and outputting the EDR direction data to data conversion means; and converting the EDR direction data to a unit vector, and outputting the unit vector as an estimated value for the EDR direction.

* * * * *

UNITED STATES PATENT AND TRADEMARK OFFICE
CERTIFICATE OF CORRECTION

PATENT NO.        : 6,931,363 B2                                              Page 1 of 1
APPLICATION NO. : 10/697762
DATED             : August 16, 2005
INVENTOR(S)       : Matasataka Andoh et al.

It is certified that error appears in the above-identified patent and that said Letters Patent is hereby corrected as shown below:

Title page, item [73] should read
--Assignee:

(73) NEC Corporation
    Tokyo, Japan and

Megu Ohtaki
    Hiroshima, Japan--

Signed and Sealed this

First Day of April, 2008

JON W. DUDAS
*Director of the United States Patent and Trademark Office*